United States Patent [19]

Aiso et al.

[11] 3,855,401

[45] Dec. 17, 1974

[54] PROCESS FOR MANUFACTURING ALUMINUM FLUORIDE

[75] Inventors: Hiroshi Aiso, Kawanishi; Takumi Takemura; Toshinobu Takeuchi, both of Osaka, all of Japan

[73] Assignee: Daikin Kogyo Kabushiki Kaisha, Osaki-shi, Japan

[22] Filed: Dec. 20, 1971

[21] Appl. No.: 209,731

[30] Foreign Application Priority Data
Dec. 23, 1970 Japan............................. 45-128265

[52] U.S. Cl................. 423/489, 423/111, 423/135, 423/495
[51] Int. Cl. ............................................ C01f 7/50
[58] Field of Search .......... 423/495, 485, 111, 489, 423/133, 135

[56] References Cited
UNITED STATES PATENTS
2,996,354  8/1961  Lacroix............................... 423/489
3,102,787  9/1963  McMillan et al. .................. 423/485
3,282,644  11/1966  Quanles ............................. 423/485
3,385,658  5/1968  Broja et al. ......................... 423/495
3,469,939  9/1969  Aiso et al............................ 423/485
3,473,887  10/1969  Chu et al. ........................... 423/495

*Primary Examiner*—Edward Stern
*Attorney, Agent, or Firm*—Larson, Taylor & Hinds

[57] ABSTRACT

A process for manufacturing aluminum fluoride comprises contacting at 300 to 550°C particulate alumina hydrate with hydrogen fluoride to produce aluminum fluoride by continuously introducing a preheated particulate alumina hydrate into a reaction zone and continuously spraying at least stoichiometric amount of liquid hydrogen fluoride to the particulate alumina hydrate continuously fed and separating the resulting aluminum fluoride in the form of particles from gaseous substances.

8 Claims, 2 Drawing Figures

PROCESS FOR MANUFACTURING ALUMINUM FLUORIDE

This invention relates to the manufacture of aluminum fluoride and more particularly to a new and improved continuous process for producing aluminum fluoride by the reaction of alumina hydrates with hydrogen flouride.

Aluminum fluoride is useful, particularly as a catalyst in fluorination reaction. In the conventional methods, aluminum fluoride has been produced by a wet process in which alumina hydrate is reacted with hydrofluoric acid or by a dry process in which alumina hydrate is fluidized to react with hydrogen fluoride gas, these methods being disclosed in U.S.P. No. 2,958,575 and U.S. P. 3,473,887 respectively. In the former method, however, complicated post-treatment, such as filtration, drying and pulverization, is necessary to separate the resultant aluminum fluoride from the reaction mixture, and further a prolonged period of reaction time is required, which causes undesired corrosion to the reaction apparatus. In the latter method, on the other hand, it is difficult to maintain fluidization conditions constant and further special skill is required in adjusting various conditions such as heating, velocity of gas to be passed, residence time and the like, hence insufficient from industrial viewpoints.

An object of the invention is to provide a process for manufacturing aluminum fluoride in a high order of yield within an extremely shortened period of reaction time.

Another object of the invention is to provide a process for manufacturing aluminum fluoride of good quality with simple procedures.

Another object of the invention is to provide a process for manufacturing aluminum fluoride in a markedly small volume of reaction apparatus protected from corrosion effectively.

Another object of the invention is to provide a process for manufacturing aluminum fluoride with high heat efficiency.

These and other objects and advantages of the invention will be apparent from the following description.

The process for manufacturing aluminum fluoride in accordance with the present invention comprises contacting particulate alumina hydrate with hydrogen fluoride at 300° to 550°C to produce aluminum fluoride by continuously introducing a preheated particulate alumina hydrate into reaction zone and continuously spraying at least stoichiometric amounts of liquid hydrogen fluoride to the particulate alumina hydrate continuously fed and separating the resulting aluminum fluoride in the form of particles from gaseous substances.

The invention is based on the discovery that when a particulate alumina hydrate is contacted with hydrogen fluoride at 300° to 550°C by continuously introducing the preheated particulate alumina hydrate to the reaction zone and spraying liquid hydrogen fluoride to the alumina hydrate, an eruptive reaction occurs immediately between hydrogen fluoride and alumina hydrate, producing aluminum fluoride in the form of small particles free from the formation of undesired coarse lumps, the reaction being capable of producing aluminum fluoride in a high order of yield within a short period of time. In fact, according to the present invention at least 90 percent of the starting coverted to aluminum flouride instantaneously and the resultant aluminum flouride is rapidly solidified to small particles within 10 seconds. Thus it is possible to obtain aluminum fluoride of high quality having homogeneous particle size in a high yield within a short period. Further, complicated procedures for separating the resultant aluminum fluoride from the reaction mixture is not required, since the aluminum fluoride can be obtained in the form of solid particles capable of being easily separated from water vapor produced and gaseous hydrogen fluoride, if left unreacted. Further, the reaction occurs instantaneously with high order of conversion of the starting alumina hydrate, so that the scale of the reactor can be reduced markedly. For example, a reactor having a dimension of 20 mm in length and 15 mm in inner diameter is usually sufficient for the purpose of producing aluminum fluoride in an amount of 1.6 ton/day. Furthermore, the reactor is hardly corroded and even when corrosion occurs thereto the reactor can be easily replaced with a new one since the volume thereof is extremely small. Moreover, there is no need to heat the reaction system externally except that the starting alumina hydrate is preheated, this ensuring effective utilization of heat.

Alumina hydrates used in the invention are, for example, aluminum hydroxide, gibbsite, bayerite and like trihydrates, and boehmite, diaspore and like monohydrates. Of these particularly preferable are trihydrates such as aluminum hydroxide, gibbsite and bayerite. In the invention the alumina hydrate is used in the form of particles. Preferable particles are those passing a 200-mesh Tyler screen.

In accordance with the present invention the alumina hydrate is preheated. Preferable temperature of the preheating is in the range of 250° to 450°C, the most desirable being a temperature of about 300°C. The preheating step is important to attain the object of the invention. For example, when gibbsite, bayerite and like alumina trihydrates are preheated, 30 to 33 wt percent of water is rapidly evolved therefrom, whereby they are activated to cause instantaneous reaction.

Liquid hydrogen fluoride used in the invention includes hydrogen fluoride in liquid state or in aqueous solution, e.g., hydrofluoric acid having a concentration of more than 80 wt percent, though the former is preferable. The liquid hydrogen fluoride may be used in combination with hydrogen silicofluoride dissolved therein. The amount of hydrogen fluoride to be used is at least stoichiometric amount relative to alumina hydrate, preferably 20 percent in excess of the stoichiometric amount. There is no need to preheat the liquid hydrogen fluoride, since the reaction between alumina hydrate and hydrogen fluoride is exothermic and the preheating of the alumina hydrate ensures the reaction temperature of 300° to 550°C.

In accordance with the present invention liquid hydrogen fluoride is sprayed to the reaction zone to contact with preheated particulate alumina hydrate which is continuously introduced to the reaction zone in the predetermined amount. One of preferred methods is to spray or jet hydrogen fluoride onto the continuous flow of particulate alumina hydrate flowing through the reaction zone. Thus the both materials are brought into contact with each other in form of spray. The direction and velocity of spraying liquid hydrogen fluoride can be freely selected according to the particle size and the speed of supply of alumina hydrate, shape and size of reactor used and other factors, though it is preferable to spray liquid hydrogen fluoride at a pressure higher than 2 kg/cm² gauge. Since the reaction is exothermic and alumina hydrate is preheated, the reaction temperature of 300° to 550°C is ensured in the reaction zone. Perferable reaction temperature is in the range of 400° to 550°C. The reaction occurs instantaneously to produce aluminum fluoride in particle form and water in vapor form. The reaction mixture is carried with spray stream and the aluminum fluoride particles thus produced are easily separated from water vapor and hydrogen fluoride gas, if left unreacted. The aluminum fluoride thus obtained has a high purity of at least 90 percent, usually more than 94 percent, which is equal to or superior to that of the commercially available aluminum fluoride.

In the invention, the exhaust gas from the reaction system which usually contains water vapor and small amount of unreacted hydrogen fluoride gas can be used for preheating and/or prereaction of the starting alumina hydrate by contacting the alumina hydrate with the exhaust gas previous to the present reaction. This ensures not only effective utilization of heat but also higher conversion of the alumina hydrate, since a part of the alumina hydrate is reacted with unreacted hydrogen fluoride to produce aluminum fluoride during the preheating step. Further, by this treatment unreacted hydrogen fluoride contained in the exhaust gas is removed.

It is also preferable to contact the exhaust gas containing water vapor and unreacted. hydrogen fluoride gas with the particulate reaction product obtained in the present reaction, whereby unreacted alumina hydrate contained in the product is fluorinated to increase the yield and purity of the product and further unreacted hydrogen fluoride gas contained in the exhaust gas can be removed. In such a case it is preferable to fluidize the particulate reaction product with which exhaust gas is brought into countercurrent content.

The invention will be described and may be further understood with reference to the accompanying drawings given for illustrative purpose only and not to be taken as limitative.

Figure 1:
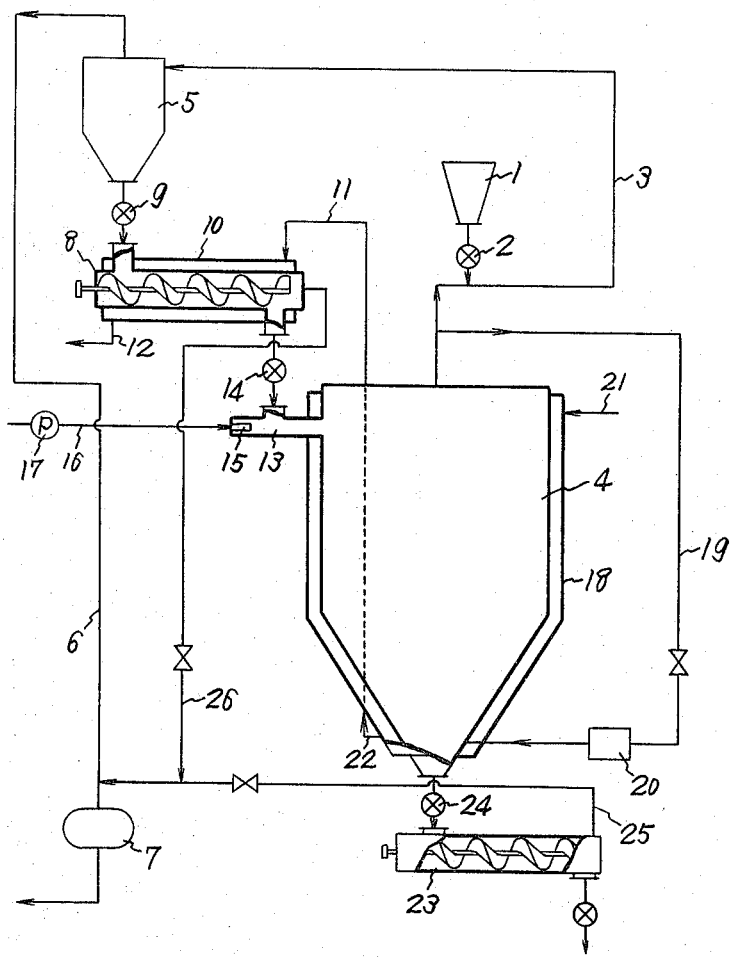
FIG. 1 shows diagrammatically one preferred apparatus for carrying out the method of the present invention with part broken away.

Referring now to FIG. 1, particulate alumina hydrate charged in hopper 1 is introduced through a rotary valve 2 to a line 3. The line 3 is connected to the top of a separator 4 at one end and to the upper portion of a cyclone 5 at the other end. The exhaust gas containing water vapor and unreacted hydrogen fluoride from the separator 4 is passed through the line 3 and brought into contact with particulate alumina hydrate. Thus the alumina hydrate is heated with the exhaust gas and partially fluorinated with the unreacted hydrogen fluoride contained in the gas. The alumina hydrate thus treated is then carried with the gas to a cyclone 5 and separated from the gas. The gas is taken out from the system through a line 6 with a blower 7. The alumina hydrate is charged to a screw-conveyor type feeder 8 through a rotary valve 9. The feeder 8 is provided with a jacket 10 through which hot gas circulates, entering through a line 11 and discharging through a line 12. The alumina hydrate charged in the feeder 8 is heated by the hot gas to the predetermined preheating temperature ranging from 250° to 450°C and delivered continuously at a controlled rate to a reactor 13 through a valve 14. The reactor 13 is provided with a nozzle 15 for spraying liquid hydrogen fluoride and made of anticorrosive materials to hydrogen fluoride. The hydrogen fluoride is introduced into the nozzle 15 through a line 16 provided with a pump 17, and sprayed from the nozzle 15 into the reactor 13. Thus the alumina hydrate continuously charged to the reaction zone is contacted with the sprayed hydrogen fluoride. Since the alumina hydrate is preheated to the predetermined temperature and the reaction is exothermic, the temperature of the reaction mixture reaches 300° to 550°C suitable for the reaction. However, if necessary, it is also possible to heat the reactor externally by conventional means. Thus the alumina hydrate is reacted with the hydrogen fluoride instantaneously to produce aluminum fluoride and water vapor. In this reaction at least 90percent of aluminum hydrate is converted to the desired aluminum fluoride. The resultant aluminum fluoride solidifies immediately to form small particles without production of coarse lumps. The particles are delivered together with water vapor and unreacted starting materials to the separator 4 provided with a jacket 18 for heating. The water vapor and unreacted hydrogen fluoride gas are separated from the particulate product and taken out from the line 3. The particulate product gradually falls down in the separator 4 while being fluidized by countercurrent contact with a part of the exhaust gas which is introduced to the separator by a line 19 provided with a compressor 20. The line 19 is connected to the line 3 at one end and to the lower portion of the separator 4 at other end. Thus the unreacted alumina hydrate contained in the product is completely reacted with hydrogen fluoride contained in the exhaust gas during its falling and at the same time unreacted hydrogen fluoride is effectively consumed by the reaction. To accelerate the post-reaction hot gas is introduced to the jacket 18 of the separator 4 through a line 21. The hot gas is discharged from the jacket 18 through a line 22 which is connected to the line 11 for introducing the hot gas to the jacket 10 of the feeder 8. The fallen particles are discharged into a screw discharger 23 through a valve 24. The discharger 23 is provided with a line 25 which is connected to the line 6 at its end to thereby take out residual water vapor from the system. Thus dried particulate aluminum fluoride having homogeneous particle size can be obtained. Designated at 26 is a line for taking out water vapor evolved from the starting alumina hydrate in the feeder 8. The line 26 is connected to the line 25 at its end.

Figure 2:
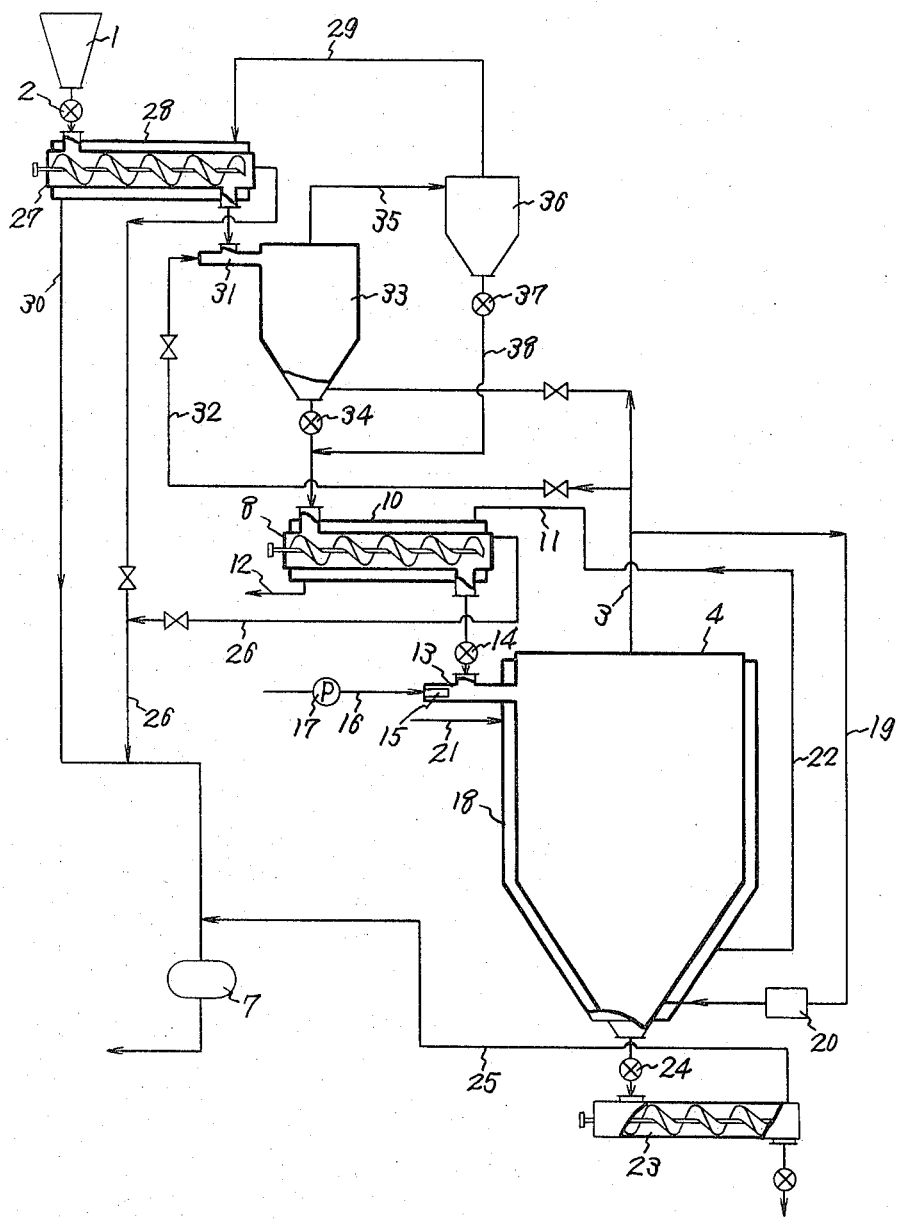
FIG. 2 shows diagrammatically another preferred apparatus for carrying out the method of the present invention with part broken away.

Referring to FIG. 2, the similar parts to those in FIG. 1 are referred to by the same reference numerals. In the apparatus shown in FIG. 2, alumina hydrate is introduced from hopper 1 to a screw-conveyer type feeder 27. The feeder 27 is provided with a jacket 28 through which hot gas circulates, entering through a line 29 and discharging through a line 30. The alumina hydrate charge in the feeder 27 is heated by hot gas and delivered continuously at a controlled rate to a prereactor 31. To the prereactor 31 exhaust gas from a separator 4 is introduced through a line 32, whereby a part of alumina hydrate is fluorinated with hydrogen fluoride contained in the exhaust gas. The resultant mixture is introduced into a preseparator 33 and brought into countercurrent contact with exhaust gas from the separator 4 introduced into the preseparator 33 from the lower portion thereof through a line 3. The solid substance, i.e., alumina hydrate partially fluorinated, is separated from gaseous substance consisting mainly of water vapor. The solid substance falls down the preseparator 33 and is fed to a screw-conveyer type feeder 8 through a rotary valve 34. The gaseous substance is exhausted from the preseparator 33 through a line 35 and introduced into a cyclone 36, in which the solid substance carried by the gaseous substance is separated. The separated solid substance is also fed to the feeder 8 through a rotary valve 37 and a line 38. The gaseous substance from the cyclone 36 is fed as a hot gas to the jacket 28 of the feeder 27 through the line 29. The aluminum hydrate partially fluorinated and supplied into the feeder 8 from the preseparator 33 and cyclone 36 is preheated and then reacted in the reactor 13 in the same manner as illustrated in FIG. 1. The resultant aluminum fluoride is treated in the separator 4 in the same manner as in FIG. 1 and discharged from the discharger 23.

For a better understanding of the invention example is given below.

Example

In this Example the apparatus shown in FIG. 1 was used, in which a reactor 13 used had a dimension of 20 mm in length and 15 mm in inner diameter.

Particulate alumina hydrate (gibbsite) passing a 200-mesh Tyler screen was fed from a hopper 1 to a line 3 and brought into contact with exhaust gas passing through the line 3 from a separator 4. The alumina hydrate was heated to 230° to 250°C and partially fluorinated. The partially fluorinated alumina hydrate was separated from the gas in a cyclone 5 and supplied to a feeder 8. The alumina hydrate was preheated in the feeder 8° to 300°C and fed to a reactor 13 at a rate of 59 kg/hr. Liquid hydrogen fluoride was sprayed thereto at a rate of 50 kg/hr at a pressure of 6 kg/cm² gauge, whereby the alumina hydrate was brought into contact with sprayed hydrogen fluoride. Thus the temperature of the reaction zone rised to 400° to 500°C and the reaction occurred instantaneously to produce aluminum fluoride and water vapor. The aluminum fluoride thus produced solidified at the same time to form solid particles. The particles were carried with spray stream and introduced into a separator 4. The temperature in the separator 4 was kept at about 400°C and the particles were brought into countercurrent contact with the exhaust gas from the lower portion of the separator 4, whereby the reaction was completed. The aluminum fluoride thus produced was discharged in the form of particles passing a 200-mesh Tyler screen from the discharger 23 at a rate of 6.65 kg/hr. The aluminum fluoride particles thus obtained had a purity of 94 wt percent and the exhaust gas from a line 6 was substantially free from hydrogen fluoride.

In the above Example, a part of the particles produced were taken out from the upper portion of the separator 4 and dried to measure the purity thereof. The particles were found to contain 92 wt percent of aluminum fluoride and 8 wt percent of alumina.

What we claim is:

1. A process for manufacturing aluminum fluoride, which comprises contacting at 300° to 550°C particulate alumina hydrate with hydrogen fluoride to produce aluminum fluoride by continuously introducing particulate alumina hydrate preheated to a temperature of from 250° to 450°C into a reaction zone and continuously spraying at least stoichiometric amounts of hydrogen fluoride in the liquid state or hydrofluoric acid having a concentration of more than 80 percent by weight onto the particulate alumina hydrate continuously fed and separating the resulting aluminum fluoride in the form of particles from gaseous substances.

2. The process according to claim 1, in which said alumina hydrate is an alumina trihydrate.

3. The process according to claim 2, in which said alumina trihydrate is aluminum hydroxide, gibbsite or bayerite.

4. The process according to claim 1, in which said alumina hydrate is preheated to a temperature of about 300°C.

5. The process according to claim 1, in which said alumina hydrate is in the form of particles passing a 200-mesh Tyler screen.

6. The process according to claim 1, in which said reaction temperature is in the rnage of 400° to 500°C.

7. The process according to claim 1, in which said alumina hydrate is previously brought into contact with gaseous substance containing unreacted hydrogen fluoride and exhausted from the reaction system.

8. The process according to claim 1, in which said aluminum fluoride produced is further brought into contact with gaseous substance containing unreacted hydrogen fluoride and exhausted from the reaction system.

* * * * *